(12) United States Patent
Zang et al.

(10) Patent No.: US 9,552,404 B2
(45) Date of Patent: Jan. 24, 2017

(54) DATA MODEL DEFINITION DISPLAY AND MODIFICATION

(71) Applicant: SAP AG, Walldorf (DE)

(72) Inventors: Yan Zang, Singapore (SG); Enrique Espinosa Garcia, San Mateo, CA (US); Lin Cao, Singapore (SG)

(73) Assignee: SAP SE, Walldorf (DE)

( * ) Notice: Subject to any disclaimer, the term of this patent is extended or adjusted under 35 U.S.C. 154(b) by 883 days.

(21) Appl. No.: 13/927,796

(22) Filed: Jun. 26, 2013

(65) Prior Publication Data

US 2015/0007039 A1    Jan. 1, 2015

(51) Int. Cl.
| | | |
|---|---|---|
| G06F 17/00 | (2006.01) |
| G06F 17/30 | (2006.01) |
| G06F 9/44 | (2006.01) |
| G06T 11/20 | (2006.01) |

(52) U.S. Cl.
CPC ....... G06F 17/30572 (2013.01); G06F 9/4443 (2013.01); G06T 11/206 (2013.01)

(58) Field of Classification Search
CPC .................................................. G06F 9/4443
USPC ........................................ 715/744; 707/804
See application file for complete search history.

(56) References Cited

U.S. PATENT DOCUMENTS

| 6,028,602 A | 2/2000 | Weidenfeller et al. |
| 7,571,426 B2 | 8/2009 | Carroll |
| 7,694,229 B2 | 4/2010 | Stoakley et al. |
| 7,720,803 B2 | 5/2010 | Unnebrink et al. |
| 7,730,027 B2 | 6/2010 | Willenborg et al. |
| 7,904,478 B2 | 3/2011 | Yu et al. |
| 7,917,888 B2 | 3/2011 | Chong et al. |
| 7,974,992 B2 | 7/2011 | Fastabend et al. |
| 8,126,937 B2 | 2/2012 | Shaburov |
| 8,321,556 B1 | 11/2012 | Chatterjee et al. |
| 8,484,549 B2 | 7/2013 | Burr et al. |
| 8,694,918 B2 | 4/2014 | Mandelstein et al. |
| 8,751,543 B2 | 6/2014 | Kamenz et al. |
| 9,093,050 B1* | 7/2015 | Orlov ........................ G09G 5/36 |
| 2005/0007383 A1 | 1/2005 | Potter et al. |
| 2007/0061074 A1* | 3/2007 | Safoutin ............ G01C 21/3682 701/431 |
| 2007/0106515 A1 | 5/2007 | Wong |
| 2008/0172407 A1* | 7/2008 | Sacks ..................... G06Q 10/10 |
| 2012/0260215 A1* | 10/2012 | Fennel .................. H04W 4/001 715/825 |
| 2014/0082512 A1 | 3/2014 | Neuert et al. |
| 2014/0279865 A1* | 9/2014 | Kumar .............. G06F 17/30699 707/609 |
| 2015/0356160 A1* | 12/2015 | Berwick ........... G06F 17/30572 715/781 |

(Continued)

*Primary Examiner* — Mohammed-Ibrahim Zuberi
(74) *Attorney, Agent, or Firm* — Jones Day

(57) ABSTRACT

Data model display and modification techniques are provided that can be executed on a wireless computing device. A data model display and modification technique includes wirelessly receiving a data model definition at a wireless communication device. A visual representation of the model definition is displayed on a display of the wireless device. User interactions with the visual representation of the model definition are recorded through the wireless device to alter the data model definition. The altered data model definition is stored, and transmitted to another device.

16 Claims, 13 Drawing Sheets

(56) References Cited

U.S. PATENT DOCUMENTS

2016/0117372 A1* 4/2016 Krafft .............. G06F 17/30572
715/739

* cited by examiner

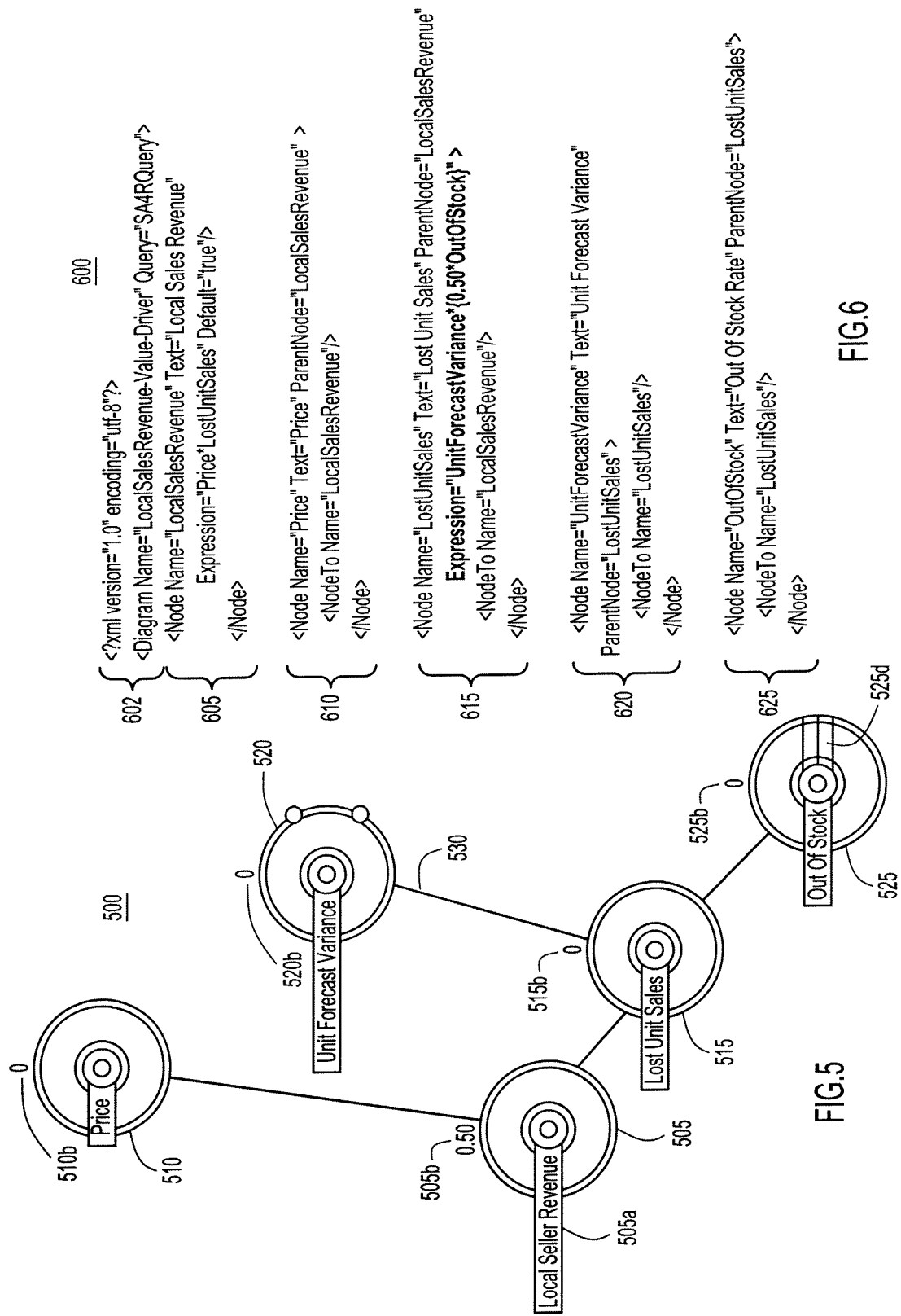

```
<?xml version="1.0" encoding="utf-8"?>
<Diagram Name="LocalSales-Value-Driver" Query="CARTQuery"/>
    <Node Name="LocalSales" Text="Local Sales" Expression="APRU+ChurnRate" Default="true"/>
    </Node>
    <Node Name="APRU" Text="APRU" ParentNode="LocalSales" Expression="LifetimeValue*CustomerCountGrowth">
        <NodeTo Name="LocalSales"/>
    </Node>
    <Node Name="LifetimeValue" Text="Lifetime Value" ParentNode="APRU">
        <NodeTo Name="APRU"/>
        <Visible=false/>
    </Node>
    <Node Name="CustomerCountGrowth" Text="Customer Count Growth" ParentNode="APRU" Expression="GrossAdds*CostPerGross" >
        <NodeTo Name="APRU"/>
        <Visible=false/>
    </Node>
    <Node Name="ChurnRate" Text="Churn Rate" ParentNode="LocalSales" Expression="CustomerSatisfication*GrossCancels">
        <NodeTo Name="LocalSales"/>
    </Node>
    <Node Name="GrossCancels" Text="Gross Cancels" ParentNode="ChurnRate" Expression="PrePaidChurn*ContractChurn" >
        <NodeTo Name="ChurnRate"/>
    </Node>
```

1000

1005 — first block
1010 — APRU block
1050 — LifetimeValue block
1055 — CustomerCountGrowth block
1015 — ChurnRate block
1020 — GrossCancels block

FIG.10A 1000 (CONT.)

```xml
<Node Name="PrePaidChurn" Text="PrePaid Churn" ParentNode="GrossCancels" >
    <NodeTo Name="GrossCancels"/>
</Node>
<Node Name="ContractChurn" Text="Contract Churn" ParentNode="GrossCancels">
    <NodeTo Name="GrossCancels"/>
</Node>
<Node Name="CustomerSatisfication" Text="Customer Satisfication" ParentNode="ChurnRate" Expression="AverageTenure*CustomerSentiment" >
    <NodeTo Name="ChurnRate"/>
</Node>
<Node Name="AverageTenure" Text="Average Tenure" ParentNode="CustomerSatisfication">
    <NodeTo Name="CustomerSatisfication"/>
    <Visible=false/>
</Node>
<Node Name="CustomerSentiment" Text="Customer Sentiment" ParentNode="CustomerSatisfication" >
    <NodeTo Name="CustomerSatisfication"/>
    <Visible=false/>
</Node>
</Diagram>
```

1030: PrePaidChurn node
1035: ContractChurn node
1025: CustomerSatisfication node
1060: AverageTenure node
1065: CustomerSentiment node

FIG.10B

```xml
<?xml version="1.0" encoding="utf-8"?>
<Diagram Name="LocalSales-Value-Driver" Query="CARTQuery">
    <Node Name="LocalSales" Text="Local Sales" Expression="APRU+ChurnRate" Default="true"/>
    </Node>
    <Node Name="APRU" Text="APRU" ParentNode="LocalSales" Expression="LifetimeValue*CustomerCountGrowth">
        <NodeTo Name="LocalSales"/>
    </Node>
    <Node Name="LifetimeValue" Text="Lifetime Value" ParentNode="APRU">
        <NodeTo Name="APRU"/>
    </Node>
    <Node Name="CustomerCountGrowth" Text="Customer Count Growth" ParentNode="APRU" Expression="GrossAdds*CostPerGross" >
        <NodeTo Name="APRU"/>
    </Node>
    <Node Name="ChurnRate" Text="Churn Rate" ParentNode="LocalSales" Expression="CustomerSatisfication*GrossCancels">
        <NodeTo Name="LocalSales"/>
    </Node>
    <Node Name="GrossCancels" Text="Gross Cancels" ParentNode="ChurnRate" Expression="PrePaidChurn*ContractChurn" >
        <NodeTo Name="ChurnRate"/>
    </Node>
    <Node Name="PrePaidChurn" Text="PrePaid Churn" ParentNode="GrossCancels" >
        <NodeTo Name="GrossCancels"/>
    </Node>
```

```
<Node Name="ContractChurn" Text="Contract Churn" ParentNode="GrossCancels">
    <NodeTo Name="GrossCancels"/>
</Node>                                                                          } 1035
<Node Name="CustomerSatisfaction" Text="Customer Satisfaction" ParentNode="ChurnRate" Expression="AverageTenure*CustomerSentiment" >
    <NodeTo Name="ChurnRate"/>
</Node>                                                                          } 1025
<Node Name="AverageTenure" Text="Average Tenure" ParentNode="CustomerSatisfaction">
    <NodeTo Name="CustomerSatisfaction"/>
</Node>                                                                          } 1260
<Node Name="CustomerSentiment" Text="Customer Sentiment" ParentNode="CustomerSatisfaction" >
    <NodeTo Name="CustomerSatisfaction"/>
</Node>                                                                          } 1265
</Diagram>
```

FIG. 12B

DATA MODEL DEFINITION DISPLAY AND MODIFICATION

TECHNICAL FIELD

The present disclosure relates to data model definitions, and in particular, to the display and modification of a data model definition.

BACKGROUND

In order to manage themselves efficiently, organizations employ systems, such as management information systems, to provide data analysis tools for evaluating an organization's current and future status based on the organizations underlying data systems. For example, many organizations employ enterprise resource planning (ERP) systems which integrate internal and external management of information across an entire organization—embracing finance/accounting, manufacturing, sales and service, customer relationship management, etc. In order to understand the substantial amount of data contained in these systems, tools have been developed to visually display what would otherwise be an overwhelming amount of information.

In recent years, as wireless and network technologies have developed and expanded, business functions have moved from standalone workstations and office desktop computers to mobile and personal devices that can access an organization's systems from practically anywhere in the world. These devices include mobile phones, feature phones, smartphones, tablet computers (such as for example an iPad™), mobile computers, handheld computers, personal desktop computers, laptop computers, in-vehicle (e.g., audio, navigation, etc.) devices, in-appliance devices, Personal Digital Assistants (PDAs), game consoles, Digital Video Recorders (DVRs) or Personal Video Recorders (PVRs), cable systems or other set-top-boxes, and other non-traditional computing devices.

BRIEF DESCRIPTION OF THE DRAWINGS

FIG. 5 illustrates an example visual display of a data model definition.

FIG. 6 illustrates the data model definition corresponding to the visual display of FIG. 5.

FIGS. 10a and 10b illustrate the data model definition corresponding to the visual display of FIG. 9.

FIGS. 12a and 12b illustrate the data model definition corresponding to the visual display of FIG. 1.

DESCRIPTION OF EXAMPLE EMBODIMENTS

Figure 1:
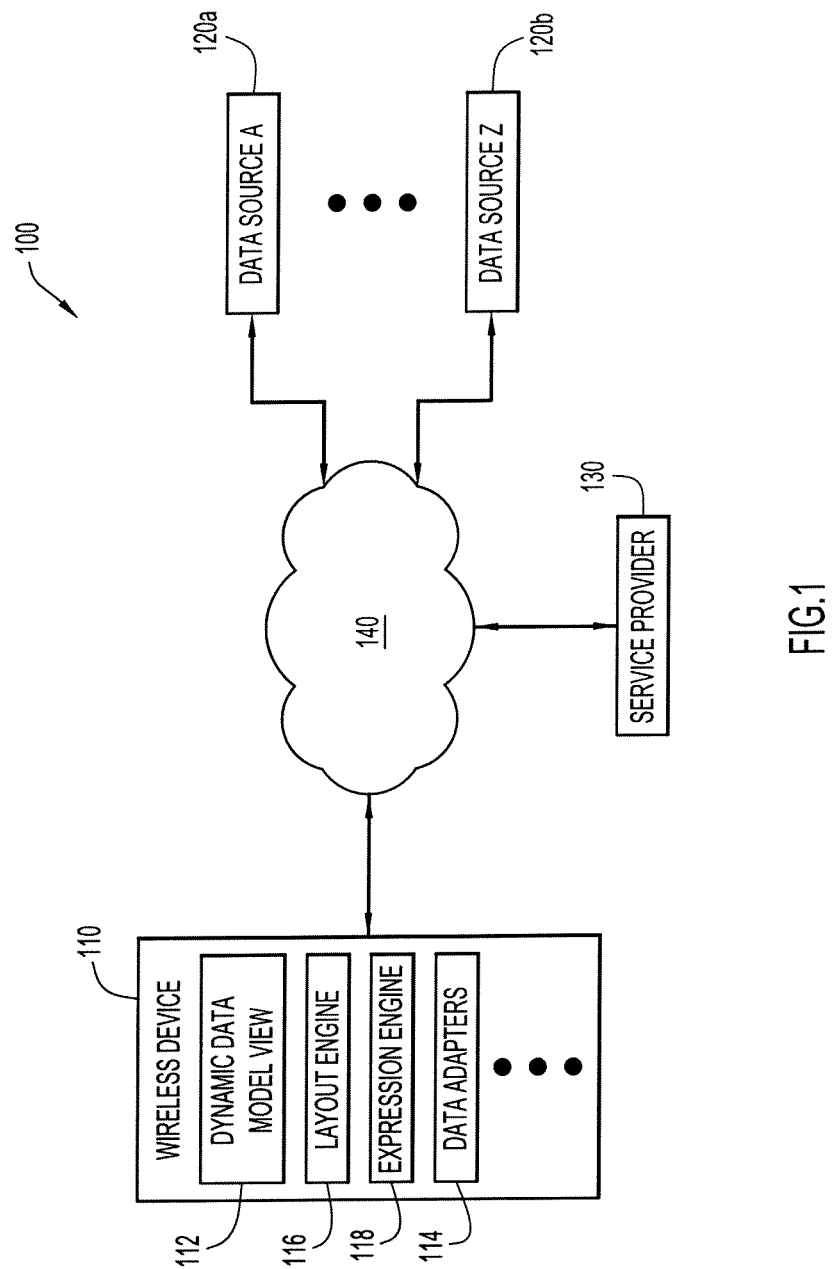
FIG. 1 illustrates an example framework for providing dynamic data model display and modification.

Depicted in FIG. 1 is a framework 100 for providing a dynamically configurable data model definition and display on a wireless device. Wireless device 110 is connected to data sources 120a and 120b and service provider 130 through wireless network 140. The wireless device be embodied in any combination of one or more of a mobile phone, a feature phone, a smartphone, a tablet computer (such as for example an iPad™), a mobile computer, a handheld computer, a laptop computer, an in-vehicle/in-appliance device, a Personal Digital Assistant (PDA), a game console, a Digital Video Recorder (DVR) or Personal Video Recorder (PVR), a cable system or other set-top-box, an entertainment system component such as a television set, and others.

According to framework 100 of FIG. 1, service provider 130 may provide wireless device 110 with a data model definition. As used herein, a data model definition refers to the structure for data to be displayed independent from the underlying data. The structure for the model definition includes the relationships between data items that may be displayed according to the definition, as well as the data sources used to acquire the data. For example, if a particular data model is directed to performing a calculation utilizing several variables, the data model definition would define the relative values of and/or the relationships between each variable, but not the particular value for each variable. Similarly, the data model may define the relative weighting assigned to different variables, regardless of the actual value assigned to each variable.

In order to both display a visual data model based on a model definition, and dynamically configure the model definition through the dynamic data model view 112, wireless device 110 first receives a data model definition from service provider 130 through wireless network 140. Service provider 130 may be embodied in one or more of a Wireless Carrier (WC), a Messaging Inter-Carrier Vendor (MICV), an Internet Service Provider (ISP), a data aggregator, a networking facilitator, a corporate entity, and/or others. Network 140 may include both wireless and wired components, including the Internet, public networks, intranets, WC networks, and others.

When the data model definition is initially received by wireless device 110, an internal representation of the data model definition is created by wireless device 110. For example, if the data model definition contains a hierarchical structure, the internal representation of the data model may comprise a structured data file or data element, such as an Extensible Markup Language (XML) file.

With the internal representation of the data model definition in place, wireless device 110 acquires data that will be used to populate the data model definition from data sources 120a and 120b. Specifically, wireless device 110 will access data sources 120a and 120b through data adaptor 114. Data adaptor 114 controls the retrieval and formatting of data according to information contained in the data model definition. For example, while the data model definition may define the source for the data to be retrieved, data adaptor 114 may handle the technical details of connecting to data sources 120a and 120b, construction of the communications used to access data sources 120a and 120b, and formatting the data received from data sources 120a and 120b to meet the requirements of the data model definition.

While data sources 120*a* and 120*b* are shown as being external to wireless device 110, other examples may access data stored on data sources which include local and/or remote data sources. Service provider 130 may also function as a data source.

Upon receipt of the data, the layout engine 116 of wireless device 110 will parse the data model for display on wireless device 110. Layout engine 116 intelligently calculates (i.e. determines and arranges) the layout of the display of the model. For example, layout engine 116 ensures that the model is displayed through dynamic data model view 112 without model elements being arranged in an overly complicated or undesirable arrangement. Layout engine 116 may also apply themes to the internal data model, enabling stylistic elements of the model to be quickly changed through the application of different themes.

Once displayed, a user may interact with the visual representation of the data model definition. Through processes described below, users may change either the display, or underlying features of the data mode definition. In response to these changes, expression engine 118 may recalculate and/or redisplay portions of the visual representation of the data model definition in response to user interactions and changes.

Figure 2:
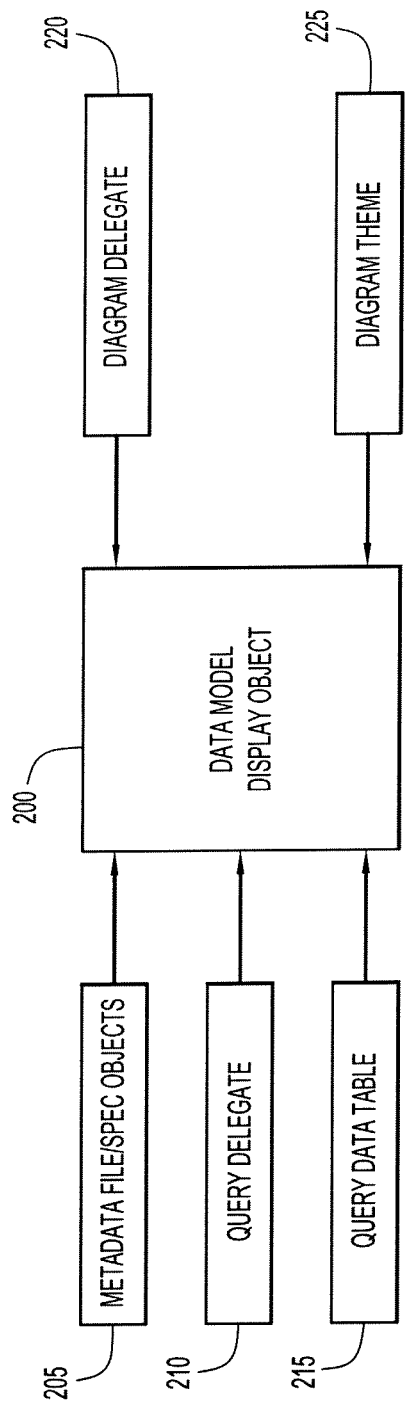
FIG. 2 illustrates a data object for using a framework providing dynamic data model display and modification.

With reference now made to FIG. 2, depicted therein is an example of a data model display object 200 and the components of the object that may be relied upon to display and modify a data model definition. Specifically, data model display object 200 is embodied in a data object that allows for the display of and interaction with a visual representation of a data model definition. For example, metadata/specification object component 205 may manage interactions with the operating system of the wireless device to appropriately configure the device to display data model display object 200. Query delegate 210 and query data table 215 allow the data model display object 200 to interact with data adaptors, such as data adaptor 114 of FIG. 1. Specifically, query delegate 210 may be configured to pass data queries to the data adaptor, allowing the data adaptor to retrieve the appropriate data from a data source. Query data table 215, on the other hand, may be configured to store the data returned from the data source via a data adaptor.

Diagram delegate 220 is a component configured to receive user interactions through the wireless device on which the data model display object 200 resides. Specifically, diagram delegate 220 is configured to translate user interactions on the wireless device into changes to the display data model display object 200 on the wireless device. For example, if a user taps a touch screen of the wireless device in a manner which is intended to move a portion of data model display object 200, diagram delegate 220 may be responsible for interpreting the user's input into the correct instructions for the data model display object 200 to appropriately display the desired move.

Also depicted in FIG. 2 is diagram theme component 225 which may be used to customize a model's display attributes such as colors, fonts, images, etc.

Figure 3:
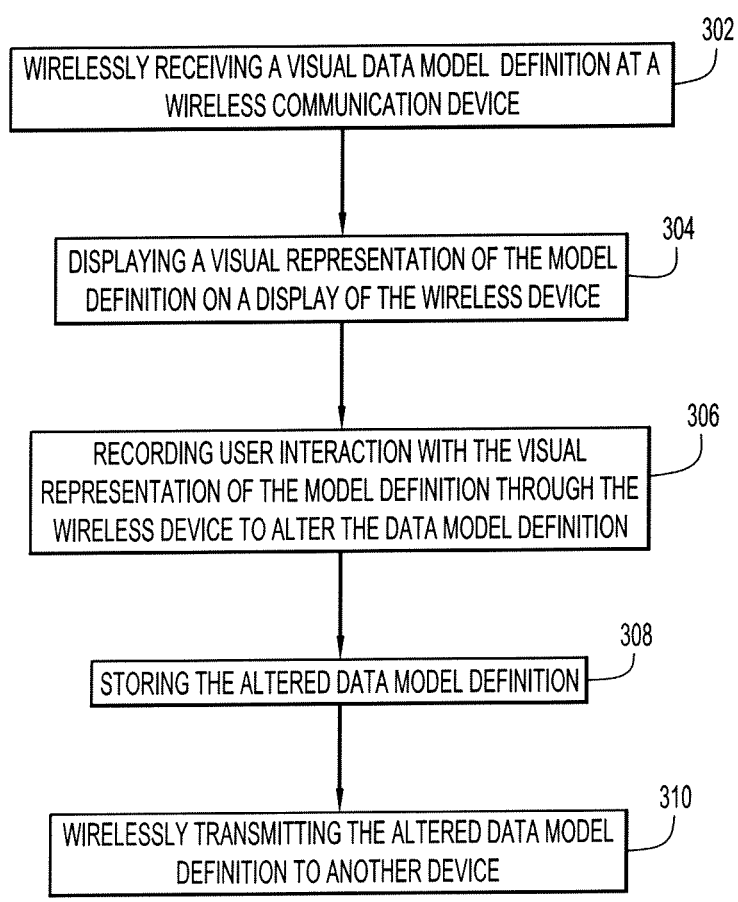
FIG. 3 is a flowchart illustrating a process for receiving, modifying, and transmitting a data model definition.

Making reference to FIG. 3, depicted therein is a flowchart 300 illustrating a method of displaying and dynamically modifying a data model definition. The process begins in step 302 where a data model definition is received at a wireless communication device. Step 302, if implemented in the environment of FIG. 1 using a data object as described in FIG. 2, may encompass the creation of a data object such as data model display object 200 of FIG. 2, which is constructed according to a model definition received from a service provider, such as service provider 130 of FIG. 1.

Once received, a visual representation of the model definition is displayed on a display of the wireless device in step 304. The display of the visual representation of the data model definition may comprise the steps taken by a layout engine, such as layout engine 116 of FIG. 1, in order to display a data model definition on a wireless device.

Interactions of a user with the visual representation of the model definition are recorded at the wireless device in step 306. The interactions of step 306 may be received through the wireless device and influence the data model definition through a diagram delegate, such as diagram delegate 220 of FIG. 2.

Alterations made to the visual representation of the model may be stored or recorded in step 308. The altered data model definition may be wirelessly transmitted to another device in step 310. For example, a wireless device may return an altered data model definition to the service provider that initially provided the original data model definition, such as service provider 130 of FIG. 1. According to other examples, the altered data model definition may be sent to other wireless devices for further interaction with and modification by additional users.

Figure 4:
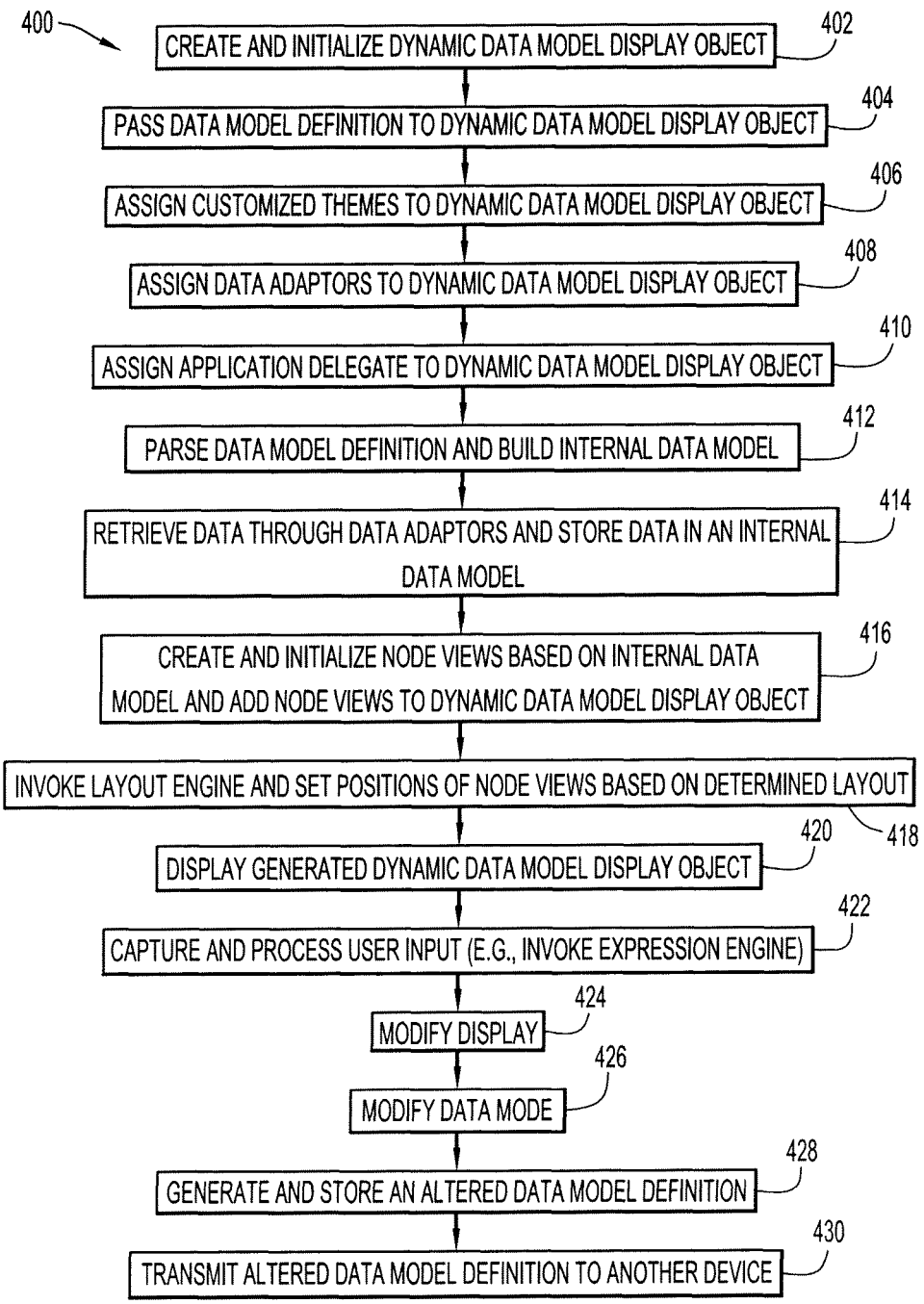
FIG. 4 is a flowchart illustrating a detailed example of the process of FIG. 3.

With reference now made to FIG. 4, depicted therein is a flowchart 400 illustrating a specific implementation of the displaying and modifying of a data model definition on a wireless device of FIG. 3. The process begins in step 402 in which a dynamic data model display object, such as data object 200 of FIG. 2, is created and initialized at a wireless device. The data object may store the data model definition, and allow the wireless device to interact with the definition through methods and/or functions associated with the dynamic data model display object.

In step 404, the data model definition is passed to the data model display object. Similarly, in step 406, customized themes are assigned to the data model display object. For example, display attributes, such as colors, fonts and images, may be applied to the data model display object through a method call to the diagram theme component 225 of FIG. 2.

In step 408, data adaptors, such as data adaptor 114 of FIG. 1, are assigned to the data model display object. Accordingly, the assigned data adaptors will allow the data model display object to communicate with data sources, such as data sources 120*a* and 120*b* of FIG. 1. Moving to step 410, diagram delegates are assigned to the data model display object which will allow the data model display object to receive input through user interactions.

In step 412, the data model definition is parsed, along with the assigned themes, the assigned data adaptors, and the assigned diagram delegates to generate an internal data model. The internal data model will be the basis of the display of the data model on the wireless device, and will allow a user to interact with the data model through the wireless.

In step 414, data is retrieved through the assigned data adaptors and stored within the internal data model. Specifically, a query delegate, such as query delegate 210 of FIG. 2, may pass a query to a data adaptor, such as data adaptor 114 of FIG. 1. The data adaptor will interface with one or more data sources, such as data sources 120*a* and/or 120*b*. The data returned to the data adaptor from the data sources may be passed to the data model object and stored in a query data table, such as query data table 215 of FIG. 2. With the internal data model constructed, and the data stored in the model, a specific view of the internal data model may be created in step 416. According to the specific example of step 416, a node structure is created for the data model, which will be described in greater detail with reference to FIGS. 5-12.

In step 418, the specific view of the internal data model is passed to a layout engine, such as layout engine 116 of FIG. 1. The layout engine will calculate the exact arrangement of the specific view of the data model for display on the wireless. For example, in a node structure, the correct distances between individual nodes may be calculated to optimize the space available on the screen of the wireless device. Similarly, the size of each individual node may be dependent, and therefore determined by the layout engine, based on the size of the screen of the wireless device.

Once the layout engine determines the positions, sizes, and other exact specifications for the display of the view of the internal data model, the internal data model is displayed on the wireless device in step 420. Once displayed, a user may interact with the view of the internal data model that is displayed on the wireless device, as indicated in step 422. The user input is captured through the expression engine and passed to the data model through a diagram delegate, such as diagram delegate 220 of FIG. 2. Accordingly, the expression engine will redisplay the view of the internal data model in step 424, while the diagram delegate may modify the internal data model in response to the user input in step 426.

In step 428, a new data model definition may be generated from the modified internal data model. Once generated, the new data model definition may be stored at the wireless device, as well as transmitted to another device in step 430.

For example, a user may optionally save aspects of some or all of a model definition (e.g., a specific layout, or combination of node values.). The saved model definition may be stored locally on the wireless device, or may be stored on another device, such as a server. Accordingly, the storing and sending steps of FIG. 3 do not necessarily have to take place in the order illustrated. According to other examples, the model definition may be stored locally, and then shared with other wireless devices.

In order to send the model definition, the wireless device may employ one or more of the following communication techniques: a Short Message Service (SMS), Multimedia Message Service (MMS), Internet Protocol (IP) Multimedia Subsystem (IMS), message exchange, a Wireless Application Protocol (WAP) exchange, a structured or an unstructured data transfer, a data transfer operation atop one or more proprietary or standards-based protocols, an Electronic Message (E-Mail) exchange, an Instant Messaging (IM) exchange, Wi-Fi, a Near Field Communication (NFC) exchange, and others.

With reference now made to FIGS. 5 and 6, depicted therein are the visual display 500 of a data model (FIG. 5) and the data model definition 600 (FIG. 6) used to generate visual display 500. Specifically, node 505 of display 500 corresponds to entry 605 in the data model definition 600, node 510 corresponds to entry 610, node 515 corresponds to entry 615, node 520 corresponds to entry 620, and node 525 corresponds to entry 525.

As depicted in FIG. 6, the model definition 600 may employ an Extensible Markup Language (XML) file format. Under such an approach, model definition 600 may contain a header portion 602 which contains, among other things
1) A model definition name. For example, "Name="LocalSalesRevenue-Value-Driver"."
2) A reference the name of a query or request or inquiry that may be executed to obtain data from a data source. For example, "Query="SA4RQuery"."

As also shown in FIG. 6, each entry 605-625 includes data values for each node, including:
3) A node name. For example, "Name="LocalSalesRevenue"" of entry 605.
4) A descriptive label. For example, "Text="Local Sales Revenue"" of entry 605
5) A formula or expression through which the value of the node may be determined or calculated For example, "Expression="Price*LostUnitSales"" of entry 605.
6) A reference to a parent node of the node. For example, "ParentNode="LocalSalesRevenue" of node 610.
7) A reference to where the value of the particular node may be referenced elsewhere. For example, "NodeTo Name="LostUnitSales" of node 625, and the values of node 625 is referenced in the "Expression" values for node 615, the node with the name "LostUnitSales."

In rendering display 500, the displayed names for the nodes are determined by the descriptive label or "Text" attribute of the "Node Name" field for each entry in definition 600. Accordingly, node 505 of FIG. 5 is given a text label 505a with the same value of the text attribute of the "Node Name" field of entry 605 in definition 600.

Similarly, the connections between nodes are rendered based on the "ParentNode" entry in each of the entries in definition 600. For example, entry 620 in FIG. 6 includes a value of "LostUnitSales" in its "ParentNode" attribute. Therefore, the visual rendering of data model definition 600 should include a connection from the node represented by entry 620 to the node represented by entry 615, the node with the name "LostUnitSales." Accordingly, display 500 includes a connection 530 from node 520 to node 515 as node 520 corresponds to entry 620 of FIG. 6, and node 515 corresponds to entry 615 of FIG. 6.

Display 500 is rendered beginning at the center of the left-hand side of a screen and may advance from left to right. Child nodes from a single parent are aligned vertically, meaning nodes 510 and 515, which are both children of node 505, are aligned along a vertical line. The display of a node's label may begin in the center of the node and advance to the left with adjustments to avoid overlapping, cropping, or truncation of labels. Other examples may begin at the top of a screen and advance vertically down. Furthermore, the specific alignment of the model display may be determined based on factors such as the size of a screen, the resolution of a screen, user preferences, and others.

In addition to the nodes and connections, some of the nodes in FIG. 5 include value labels, such as value labels 505b, 510b, 515b, 520b and 525b. Using 505b as an example, the displayed value of the value label 505b is tied to the "Expression" value of the "Node Name" attribute of the entry in the data model definition 600. Accordingly, value label 505b is based on the "Expression" value of the "Node Name" attribute of entry 605 in the data model definition 600.

Additional data labels may also be applied to nodes. For example, values such as a retrieved value, an initial value, a maximum allowed value, a minimum allowed value, a current value, a previous value (or values), a preferred value, an optimal value, and others may also be displayed.

Also depicted in FIG. 5 is model modifier 525d. Model modifiers, such as modifier 525d allow a user to optimized the displayed data definition. For example, model modifiers may allow user to optimize a model (based on, for example, a supplied set of parameters or constraints), reset a model, change optimization parameters or constraints, repeat an optimization process, and walk through an optimization process one step at a time. Additionally, such an optimization capability may allow a WD user to save various of the optimization parameters or constraints along with a resulting model. Because a user is able to modify and optimize a data model definition, the displayed data model may be considered an "Influence Diagram." An influence diagram refers to the ability to flexibly, extensibly, and dynamically configure an environment within which a user of a WD may be able to easily, quickly, and intuitively perform a range of what-if, cause-and-effect, impact assessment, analytic, and/or explorative exercises against a (e.g., business, etc.) model.

In display 500, a user is able to rotate model modifier 525d by rotating it around a pivot point at the center of node 525. By rotating model modifier 525d, the values associated with node 525 may be changed throughout the date model definition. As shown in FIG. 6, the "Expression" value for entry 615 includes a weighted value of the expression for the "OutOfStock" node of entry 620. Specifically, the "OutOfStock" value is currently given a weight value of "0.50." The model modifier 525d of FIG. 500 may be tied to the weighting of the "OutOfStock" node in entry 615 of FIG. 6. For example, because the weighting of the "OutOfStock" node is set to "0.50" model modifier is positioned at the "3 O' Clock" position, causing 50% of node 525 to be shaded. Rotating model modifier 525d may change the weighting value from "0.50" to another value in the "Expression" value for entry 615, along with a corresponding change in the amount of shading of node 525.

Figures 7, 8:
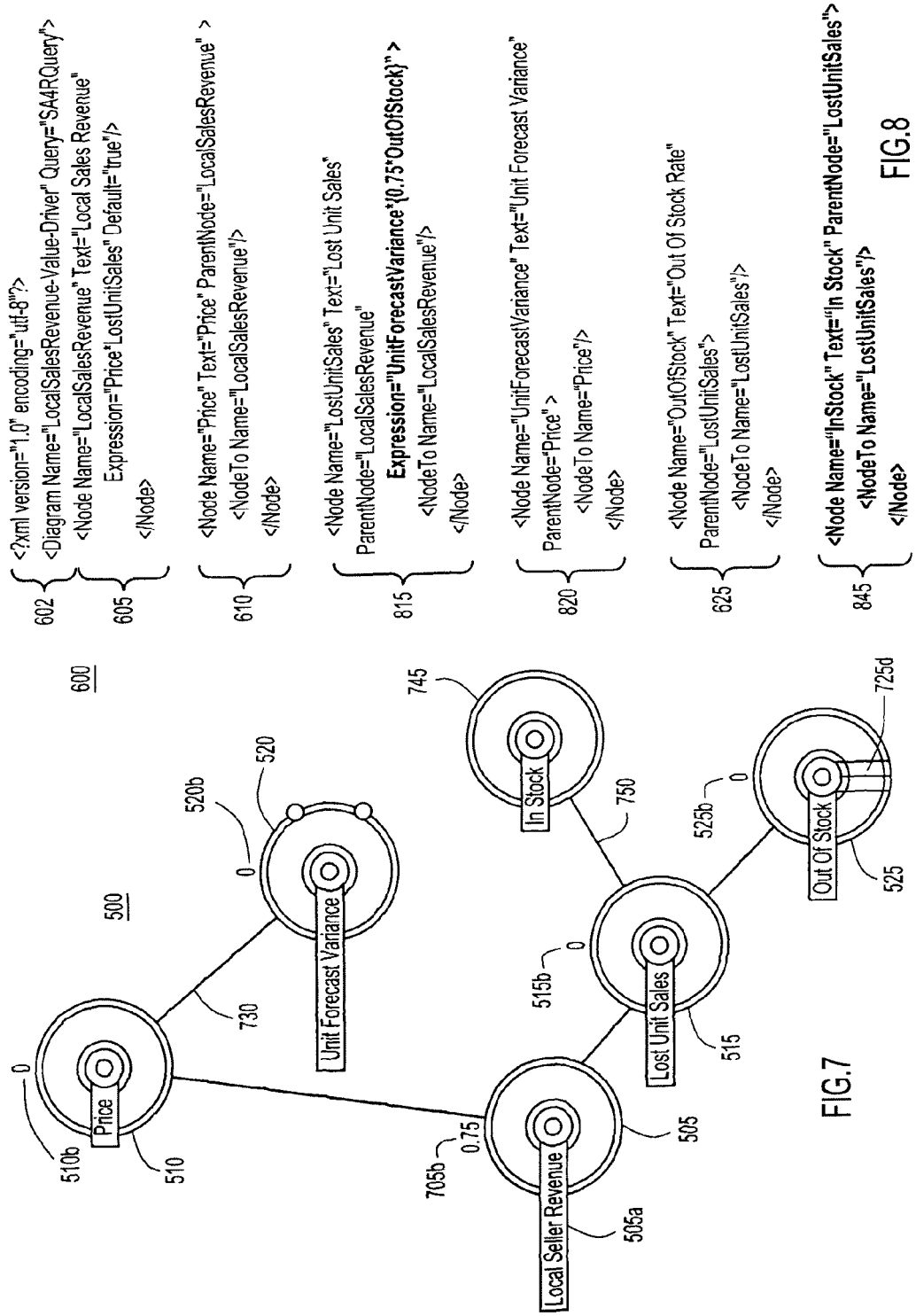
FIG. 7 illustrates a second example of a visual display of a data model definition.
FIG. 8 illustrates the data model definition corresponding to the visual display of FIG. 7.

With reference now made to FIGS. 7 and 8, depicted therein are example changes a user may make to visual display of a data model, as well as the underlying changes that may take place in the data model definition from which the visual display is derived. Specifically, FIG. 7 shows display 500 after a user has made changes to the display. Accordingly, where no changes were made, reference numerals are used which are the same as those in FIG. 5. On the other hand, where changes have been made, new reference numerals have been used. Similarly, FIG. 8 illustrates the underlying changes made to data model definition 600 in response to the changes made by the user to display 500. Accordingly, where the data definition 600 remains unchanged, reference numerals identical to those of FIG. 6 have been used. On the other hand, where data model definition 600 has changed, new reference numerals are used.

The first change made by the user in FIG. 7 is that the connector 730 from node 520, which used to point to node 515 (as illustrated by connector 530 of FIG. 5) now points to node 510. The change may be accomplished by a user clicking on the connector through a touch sensitive screen of a wireless device, and dragging the connector from node 515 to node 510. If the framework of FIG. 1 is used to implement the changes, expression engine 118 of FIG. 1 may be used to implement the change.

The change to display 500 is reflected in data model definition 600 through entry 820. Where entry 620 of FIG. 6 previously recorded a value of "LostUnitSales" for the "ParentNode" attributes, these attributes now reflect a value of "Price" in entry 820 of FIG. 8. If the framework of FIGS. 1 and 2 is implemented to make this change, expression engine 118 of FIG. 1 may pass the change made by the user to a diagram delegate 220 of FIG. 2 which records the change in data mode definition 600 of FIG. 8.

Another change reflected in FIG. 7, is the user has rotated model modifier 725d from the "3 O'Clock" position illustrated by model modifier 525d of FIG. 5 to the "6 O'Clock" position shown in FIG. 7, thereby causing 75% of the node 525 to be shaded. As with the change to connector 730, this change may also be carried out by the expression engine 118 of FIG. 1. The change is also reflected in data model definition 600 in entry 815. As shown in FIG. 8, the "Expression" value for entry 815 has changed from "0.50" to "0.75" to reflect the change made through model modifier 725d of FIG. 7. If the framework of FIGS. 1 and 2 is implemented to make this change, expression engine 118 of FIG. 1 may pass the change made by the user to a diagram delegate 220 of FIG. 2 which records the change in data mode definition 600 of FIG. 8.

Furthermore, because entry 610 of data model definition references the "Expression" value of entry 815, the change to entry 815 results in a change to the "Expression" value for node 610. Accordingly, expression engine 118 of FIG. 1 may be leveraged to recalculate the "Expression" associated with node 505 and update value label 705b.

A third change made in FIG. 7 is the addition of node 745 and connector 750. As illustrated, a user has created new node 745 through interactions with an expression engine, such as expression engine 118 of FIG. 1. Similarly, connection 750, connecting node 745 to node 515 is created through interactions with expression engine 118 of FIG. 1. In response to these additions, a diagram delegate, such as diagram delegate 220, may create new entry 845 in data model definition 600 of FIG. 8. Entry 845 appropriately defines the characteristics of node 745 and connector 750 of FIG. 7.

Figure 9:
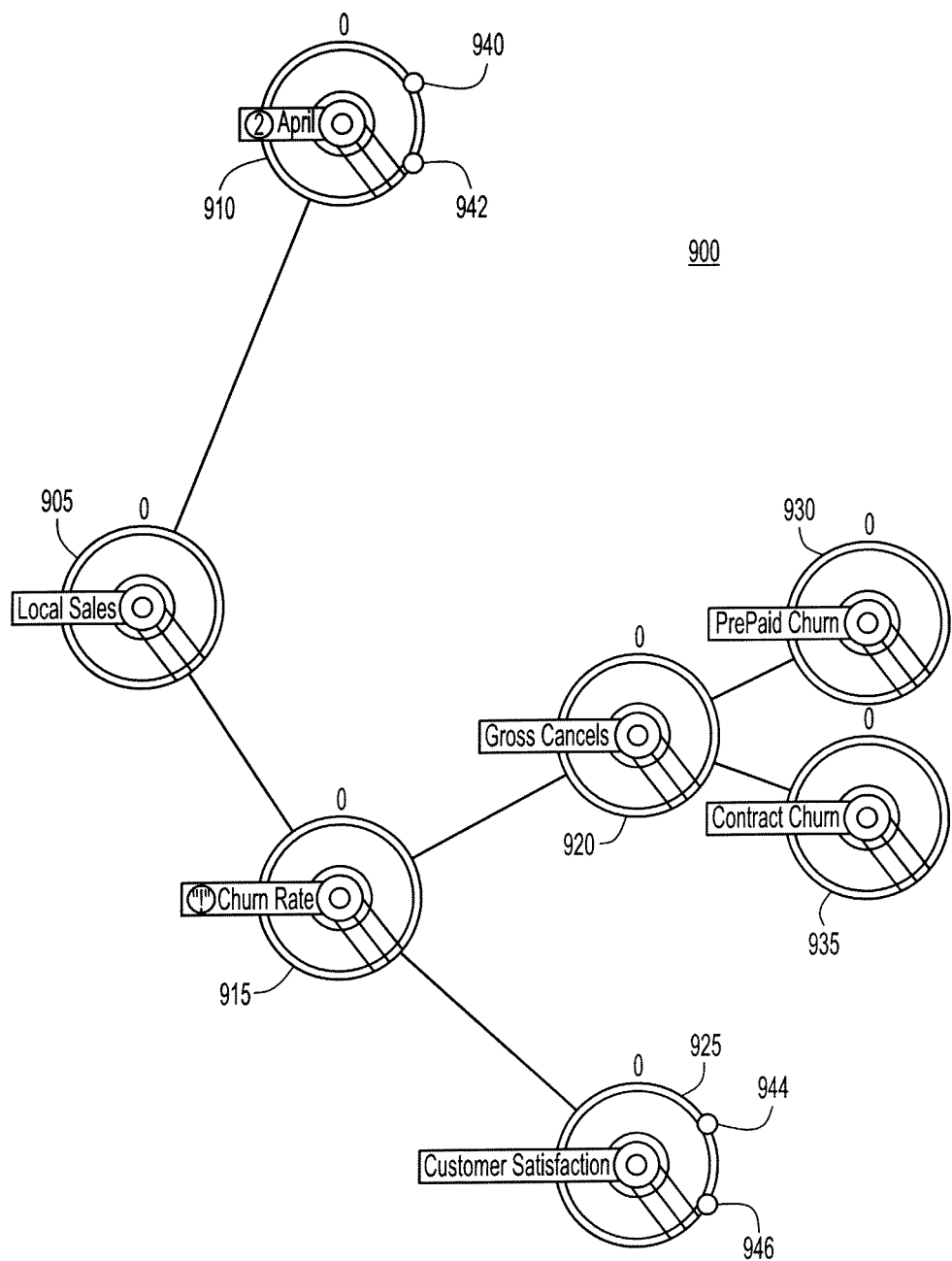
FIG. 9 illustrates a third example of a visual display of a data model definition.

With reference now made to FIGS. 9, 10a and 10b, depicted therein are a second example of a visual display of a data model 900 of FIG. 9, and the corresponding data model definition 1000 of FIGS. 10a and 10b. As with the previous examples of FIGS. 5-8, visual display 900 of FIG. 9 is embodied in a plurality of nodes 905-935, with corresponding entries 1005-1020 of FIG. 10a and entries 1030 and 1035 of FIG. 10b in data mode definition 1000. Though, examination of FIG. 10b, will show that there are entries 1050, 1055, 1060 and 1065 for which there are no corresponding nodes in visual representation 900. Specifically, entries 1050 and 1055 are for nodes that would be connected to node 910 of FIG. 9, while entries 1060 and 1065 are for nodes that would be connected to 925 of FIG. 9. Yet, no such nodes are displayed in visual representation 900. This is because entries 1050, 1055, 1060 and 1065 of FIG. 10b all include the attribute of "Visible=false," which serves as an indication to, for example, layout engine 116 of FIG. 1, that nodes for these entries should not be rendered.

In order to alert the user that these nodes exist, FIG. 9 does include hidden node indicators 940, 942, 944 and 946. Hidden node indicators 940, 942, 944 and 946 may be a visual representation of a diagram delegate, such as diagram delegate 220 of FIG. 2. The purpose of indicators 940, 942, 944 and 946 is two-fold. First, indicators 940, 942, 944 and 946 alert the user that the underlying data model definition supports additional nodes that are not currently displayed. Second, indicators 940, 942, 944 and 946 provide the user with the ability to display the hidden nodes. For example, by double tapping, clicking, or using other input, the user may indicate an intention to view one or more nodes corresponding to indicators 940, 942, 944 and 946. In response, an expression engine, such as expression engine 118 of FIG. 1, may register the user's input and display the corresponding nodes. Either simultaneously, or in response to a user action, such as a desire to save the current visual display as a new data definition, a diagram delegate, such as diagram delegate 220 of FIG. 2, may simultaneously update the corresponding data definition to indicate that the previously hidden nodes should now be visible.

Figure 11:
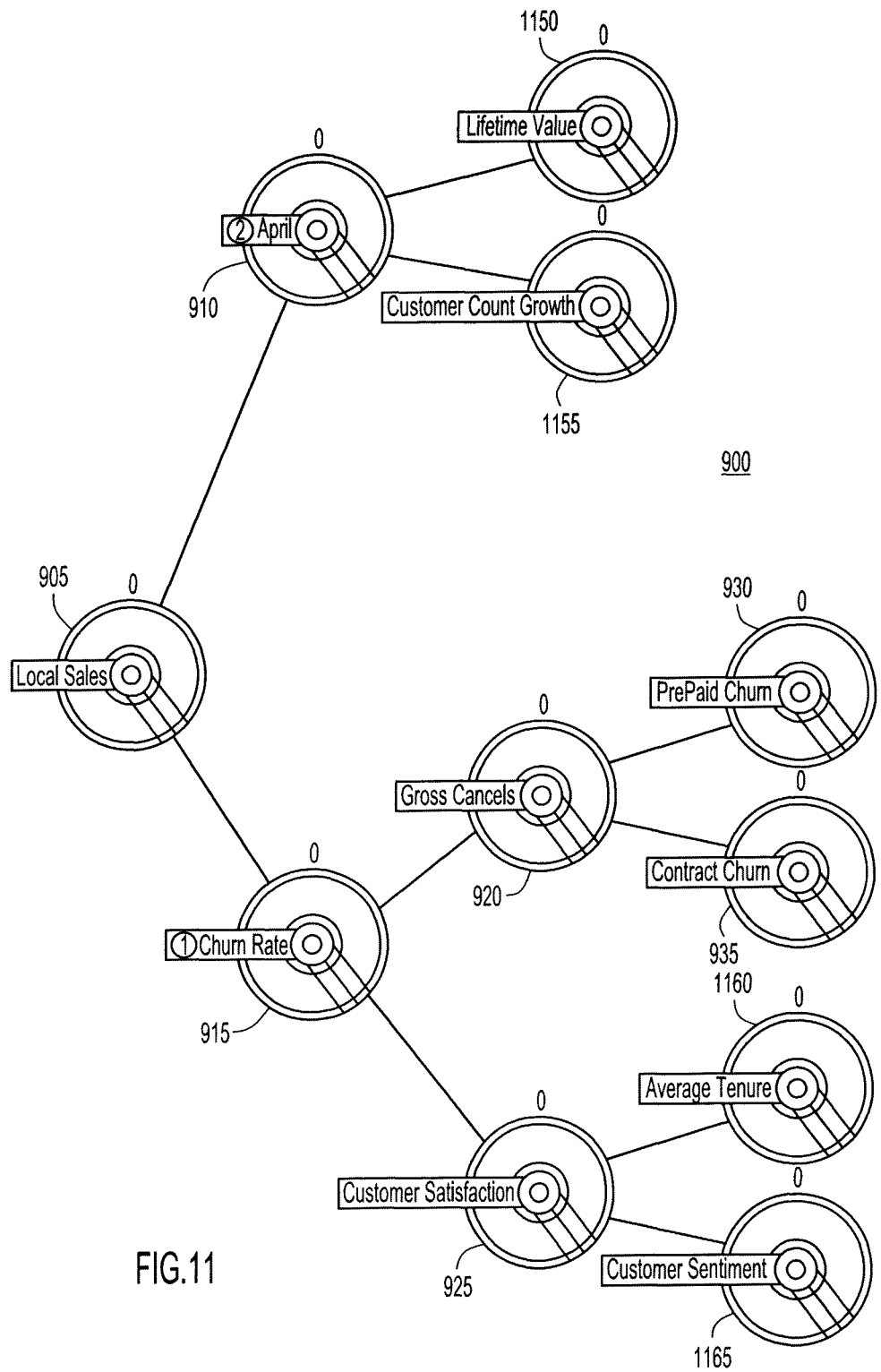
FIG. 11 illustrates a fourth example of a visual display of a data model definition.

With reference now made to FIG. 11, display 900 is shown with the inclusion of previously hidden nodes 1150, 1155, 1160 and 1165, which have replaced hidden node indicators 940, 942, 944 and 946 of FIG. 9.

Turning to FIGS. 12a and 12b, the corresponding changes made to data model definition 1000 can be seen through the changes to entries 1250, 1255, 1260 and 1265 in FIG. 12b. Specifically, the default view setting for data model definition 1000 is that every node should be visible unless otherwise indicated. Accordingly, in response to the user input indicating an intention to view the hidden nodes, the "Visible=false" attributes in entries 1050, 1055, 1060 and 1065 of FIG. 10b have been removed from corresponding entries 1250, 1255, 1260 and 1265 of FIG. 12b by a diagram delegate, such as diagram delegate 220 of FIG. 2. According to other examples, the "Visible" attribute for these entries may have been changed to "Visible=true" or through another indication consistent with the techniques taught herein.

Figure 13:
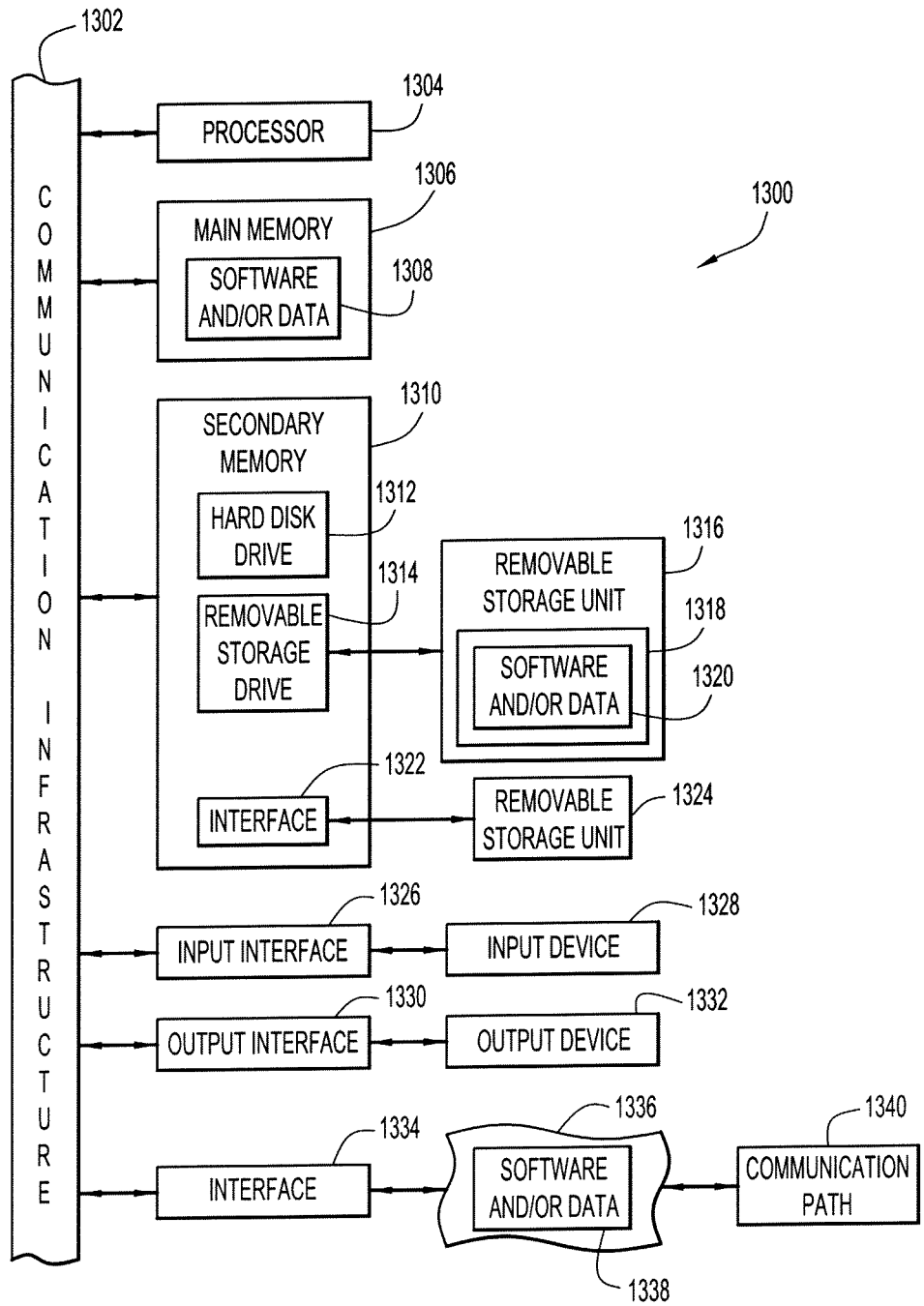
FIG. 13 illustrates an example computing system configured to perform data model display and modification.

With reference now made to FIG. 13, illustrated therein is an example computer system 1300 in which aspects of the above disclosure, or portions thereof, may be implemented as possibly inter alia computer-readable code. Computer system 1300 may be (or may be part of) a server or other electronic device or appliance configured to operate in accordance with the functionality described herein.

Computer system 1300 includes one or more processors, such as processor 1304. Processor 1304 can be a special purpose processor or a general purpose processor. Processor 1304 is connected to a communication infrastructure 1302 (for example, a bus or a network).

Computer system 1300 also includes a main memory 1306, preferably Random Access Memory (RAM), containing possibly inter alia computer software and/or data 1308.

Computer system 1300 may also include a secondary memory 1310. Secondary memory 1310 may include, for example, a hard disk drive 1312, a removable storage drive 1314, a memory stick, etc. A removable storage drive 1314 may comprise a floppy disk drive, a magnetic tape drive, an optical disk drive, a flash memory, or the like. A removable storage drive 1314 reads from and/or writes to a removable storage unit 1316 in a well known manner. A removable storage unit 1316 may comprise a floppy disk, magnetic tape, optical disk, etc. which is read by and written to by removable storage drive 1314. As will be appreciated by persons skilled in the relevant art(s) removable storage unit 1316 includes a computer usable storage medium 1318 having stored therein possibly inter alia computer software and/or data 1320.

In alternative implementations, secondary memory 1310 may include other similar means for allowing computer programs or other instructions to be loaded into computer system 1300. Such means may include, for example, a removable storage unit 1324 and an interface 1322. Examples of such means may include a program cartridge and cartridge interface (such as that found in video game devices), a removable memory chip (such as an Erasable Programmable Read-Only Memory (EPROM), or Programmable Read-Only Memory (PROM)) and associated socket, and other removable storage units 1324 and interfaces 1322 which allow software and data to be transferred from the removable storage unit 1324 to computer system 1300.

Computer system 1300 may also include an input interface 1326 and a range of input devices 1328 such as, possibly inter alia, a keyboard, a mouse, etc.

Computer system 1300 may also include an output interface 1330 and a range of output devices 1332 such as, possibly inter alia, a display, one or more speakers, etc.

Computer system 1300 may also include a communications interface 1334. Communications interface 1334 allows software and/or data 1338 to be transferred between computer system 1300 and external devices. Communications interface 1334 may include a modem, a network interface (such as an Ethernet card), a communications port, a Personal Computer Memory Card International Association (PCMCIA) slot and card, or the like. Software and/or data 1338 transferred via communications interface 1334 are in the form of signals 1336 which may be electronic, electromagnetic, optical, or other signals capable of being received by communications interface 1334. These signals 1336 are provided to communications interface 1334 via a communications path 1340. Communications path 1340 carries signals and may be implemented using wire or cable, fiber optics, a phone line, a cellular phone link, a Radio Frequency (RF) link or other communications channels.

As used in this document, the terms "computer program medium," "computer usable medium," and "computer readable medium" generally refer to media such as removable storage unit 1316, removable storage unit 1324, and a hard disk installed in hard disk drive 1312. Signals carried over communications path 1340 can also embody the logic described herein. Computer program medium and computer usable medium can also refer to memories, such as main memory 1306 and secondary memory 1310, which can be memory semiconductors (e.g. Dynamic Random Access Memory (DRAM) elements, etc.). These computer program products are means for providing software to computer system 1300.

Computer programs (also called computer control logic) are stored in main memory 1306 and/or secondary memory 1310. Computer programs may also be received via communications interface 1334. Such computer programs, when executed, enable computer system 1300 to implement the techniques discussed herein. In particular, the computer programs, when executed, enable processor 1304 to implement, e.g., the functions of supplemental information delivery logic 134. Accordingly, such computer programs represent controllers of the computer system 1300. Where the techniques are implemented using software, the software may be stored in a computer program product and loaded into computer system 1300 using removable storage drive 1314, interface 1322, hard drive 1312 or communications interface 1334.

The techniques described herein are also directed to computer program products comprising software stored on any computer useable medium. Such software, when executed in one or more data processing devices, causes data processing device(s) to operate as described herein. Embodiments may employ any computer useable or readable medium, known now or in the future. Examples of computer useable mediums include, but are not limited to, primary storage devices (e.g., any type of random access memory), secondary storage devices (e.g., hard drives, floppy disks, Compact Disc Read-Only Memory (CD-ROM) disks, Zip disks, tapes, magnetic storage devices, optical storage devices, Microelectromechanical Systems (MEMS), nano-technological storage device, etc.), and communication mediums (e.g., wired and wireless communications networks, local area networks, wide area networks, intranets, etc.).

The above description is intended by way of example only. Various modifications and structural changes may be made therein without departing from the scope of the concepts described herein and within the scope and range of equivalents of the claims.

What is claimed is:

1. A method comprising:
wirelessly receiving a data model definition at a wireless communication device;
displaying a visual representation of the data model definition on a display of the wireless device, the displaying the visual representation of the data model definition comprising:
displaying a hierarchical structure of the data model definition of nodes and interconnections between the nodes; and
applying diagram delegates to one or more nodes of the hierarchical structure, the applying the diagram delegates to the one or more nodes comprising displaying an icon associated with a node, wherein the icon is configured to allow a user to interact with the icon by rotating the icon to change a value associated with the node;
while displaying the visual representation of the data model definition, detecting a user interaction with the icon comprising rotating the icon by an angle;
in response to detecting the user interaction with the icon, recording the user interaction with the visual representation of the data model definition through the wireless device to alter an entry in the data model definition based on the angle of rotating the icon, the entry corresponding to the node associated with the rotated icon, and changing the value associated with the node based on the angle;
storing the altered data model definition; and
wirelessly transmitting the altered data model definition to another device.

2. The method of claim 1, wherein recording user interactions with the visual representation comprises recording interactions including at least one of adding a new node, adding a new connection, rearranging a connection, or modifying a node with at least one diagram delegate.

3. The method of claim 1, wherein recording user interaction with the visual representation of the data model definition comprises recording interactions made through at least one diagram delegate to change the value of a node.

4. The method of claim 1 further comprising: applying data adaptors to the data model definition; and receiving data associated with the data model definition through the data adaptor.

5. The method of claim 4, further comprising:
modifying the data model definition through at least one of the diagram delegates; and
wirelessly retrieving additional data in response to the modifying.

6. The method of claim 1, wherein displaying the visual representation of the data model definition comprises displaying a first icon corresponding to an entry in the data model definition; and hiding a second icon corresponding to a second entry in the data model definition, wherein the hiding is performed in response to an attribute in the second entry.

7. The method claim 6, further comprising:
displaying the second icon in response to a user interaction; and
modifying the attribute in the second entry in the data model definition in response to the user interaction.

8. The method of claim 1, wherein receiving the data model definition comprises receiving an Extensible Markup Language (XML) file.

9. The method of claim 8, wherein storing the altered data model definition comprises generating an altered XML file.

10. An apparatus, comprising:
a memory operable to store logic instructions and a plurality of data objects;
a display;
a network interface operable to communicate with a wireless network; and
a processor, wherein the memory, network interface and processor are communicatively coupled to each other and wherein the logic instructions, when executed by the processor, are operable to:
wirelessly receive a data model definition;
display a visual representation of the data model definition on the display, and to display the visual representation, the processor is configured to:
display a hierarchical structure of the data model definition of nodes and interconnections between the nodes; and
apply diagram delegates to one or more nodes of the hierarchical structure, and to apply the diagram delegates to the one or more nodes, the processor is configured to:
display an icon associated with a node, wherein the icon is configured to allow a user to interact with the icon by rotating the icon to change a value associated with the node;
while displaying the visual representation of the data model definition, detect a user interaction with the icon comprising rotating the icon by an angle;
in response to detecting the user interaction with the icon, record the user interaction with the visual representation of the data model definition to alter an entry in the data model definition based on the angle of rotating the icon, the entry corresponding to the node associated with the rotated icon, and change the value associated with the node based on the angle;
store the altered data model definition; and
wirelessly transmit the altered data model definition to another device.

11. The apparatus of claim 10, wherein to display the visual representation, the processor is further configured to:
apply data adaptors to the data model definition; and
receive data associated with the data model definition through the data adaptor.

12. The apparatus of claim 10, wherein to receive the data model definition, the processor is further configured to receive an Extensible Markup Language (XML) file.

13. The method of claim 1, wherein the node corresponding to the altered entry is rendered invisible in the visual representation of the data model definition on the display based on the changed value of the node.

14. One or more computer readable storage media encoded with software comprising computer executable instructions and when the software is executed by a processor, cause the processor to:
wirelessly receive a data model definition;
display a visual representation of the data model definition on the display, and the instructions operable to display the visual representation, cause the processor to:
display a hierarchical structure of the data model definition of nodes and interconnections between the nodes; and
apply diagram delegates to one or more nodes of the hierarchical structure, and the instructions operable to apply the diagram delegates to the one or more nodes, cause the processor to:

display an icon associated with a node, wherein the icon is configured to allow a user to interact with the icon by rotating the icon to change a value associated with the node;

while displaying the visual representation of the data model definition, detect a user interaction with the icon comprising rotating the icon by an angle;

in response to detecting the user interaction with the icon, record the user interaction with the visual representation of the data model definition to alter an entry in the data model definition based on the angle of rotating the icon, the entry corresponding to the node associated with the rotated icon, and further change the value associated with the node based on the angle;

store the altered data model definition; and wirelessly transmit the altered data model definition to another device.

15. The computer readable storage media of claim 14, wherein the instructions operable to display the visual representation, cause the processor to:

apply data adaptors to the data model definition; and receive data associated with the data model definition through the data adaptor.

16. The computer readable storage media of claim 14, wherein the instructions operable to receive the data model definition, cause the processor to receive an Extensible Markup Language (XML) file.

* * * * *